(12) United States Patent
Rembert

(10) Patent No.: US 6,861,766 B2
(45) Date of Patent: Mar. 1, 2005

(54) HYDRO-ELECTRIC GENERATING SYSTEM

(76) Inventor: Peter Rembert, 10599 Brookside Dr., Newburgh, IN (US) 47630

( * ) Notice: Subject to any disclaimer, the term of this patent is extended or adjusted under 35 U.S.C. 154(b) by 27 days.

(21) Appl. No.: 09/999,027

(22) Filed: Dec. 3, 2001

(65) Prior Publication Data

US 2003/0102676 A1 Jun. 5, 2003

(51) Int. Cl.$^7$ ................................................ F03B 17/00
(52) U.S. Cl. .............................. 290/43; 290/54; 60/398
(58) Field of Search .......................... 290/1 R, 43, 44, 290/54, 55; 60/389, 698, 413

(56) References Cited

U.S. PATENT DOCUMENTS

| | | | |
|---|---|---|---|
| 1,247,520 A | | 11/1917 | Fessenden |
| 3,996,741 A | * | 12/1976 | Herberg ........................ 60/398 |
| 4,010,614 A | * | 3/1977 | Arthur ..................... 60/641.15 |
| 4,058,979 A | * | 11/1977 | Germain ...................... 60/327 |
| 4,166,222 A | * | 8/1979 | Hanley ........................ 290/55 |
| 4,206,608 A | * | 6/1980 | Bell ............................ 60/698 |
| 4,321,475 A | * | 3/1982 | Grub ........................... 290/52 |
| 4,380,419 A | * | 4/1983 | Morton ...................... 417/334 |
| 4,426,846 A | * | 1/1984 | Bailey ......................... 60/398 |
| 4,443,707 A | | 4/1984 | Scieri |
| 6,023,105 A | * | 2/2000 | Youssef ....................... 290/54 |
| 6,051,892 A | | 4/2000 | Toal, Sr. |
| 6,097,104 A | * | 8/2000 | Russell ........................ 290/54 |
| 6,099,255 A | * | 8/2000 | Lee ......................... 416/169 R |
| 6,100,600 A | * | 8/2000 | Pflanz .......................... 290/54 |

OTHER PUBLICATIONS

Chelsea Green Publishing Company White River Junction, Vermont.

* cited by examiner

Primary Examiner—Nicholas Ponomarenko
(74) Attorney, Agent, or Firm—Charles L. Thomason

(57) ABSTRACT

A hydro-electric generating system for generating electrical energy and storing kinetic energy, in which, the process begins with the top reservoir filled with water directly from a river or local utility via a conduit.

Then a multi megawatt wind turbine, such as the NEG micon 2-megawatt turbine, placed at heights, on the side of the structure that have never been reached with a man made mast or tower. The mega structure along with the extreme heights of this system will achieve increased wind shear on a high average. The wind turbine is secured to a cart for movement of the cart and the wind turbine. The wind turbine can move to locations along a track relative to wind direction. The wind turbine is the means to power the second pump. The second pump constantly replenishes the upper reservoir with water. The wind turbine produces more electricity than what the second pump requires. This surplus of electricity is sent, via electrical conductors to the regional power grid, which distributes power to cities and towns.

The hydroelectric generator/pump, reversible, now has the kinetic energy above that is necessary to turn it's rotor blades and generate megawatts of electricity. This electricity is also sent to the electrical grid system via the electrical conductors. The hydro-electric generator/pump, which is reversible, is also used to replenish the upper reservoir. When back fed with electricity from the regional grid system or the wind turbine. The hydro-electric generator/pump, reverses and functions as a mega pump. This is efficient during off peak periods, when electricity is in less demand and, sold at a lower rate The water that is stored during off peak is released from the upper reservoir during peak periods. The water will flow down the conduit to the hydro-electric generator producing electricity in the greatly needed peak periods, this cycle is repeated as often as necessary.

9 Claims, 3 Drawing Sheets

US 6,861,766 B2

HYDRO-ELECTRIC GENERATING SYSTEM

FIELD OF THE INVENTION

This invention relates generally to a hydro-electric generating system for a tall structure that in the preferred embodiment, generates electrical energy in two (2) ways, first, by utilizing a multi-megawatt turbine wherein the turbine is positioned at or near the top exterior of the building, thereby causing increased wind shear. Said turbine is movably positioned on a track system that transports the turbine into a position to best utilize wind currents and for easy access for maintenance, repair and/or replacement purposes. Second, by utilizing fluid power.

BACKGROUND INFORMATION

Wind as a source of energy and fluid power is a concept that has been promoted for some time. Likewise, the United State Patent and Trademark Office has granted a number of patents on windmill and fluid power devices. Despite continued research and development, no wind turbine device has appropriately addressed some of the most important problems which have seemingly hindered this source of energy.

In the past, wind driven power generators of all sorts have attempted to harness the energy present in the wind. However, no prior art has effectively resolved the problem of inadequate power production due to low to moderate wind speeds; or, on the other hand, resolve the concerns related to common damage to the turbine caused by high speed wind. Further, wind turbines are commonly mounted at remote sites, to the top of a tall tower by means of an extremely large crane. This customary method of mounting the wind turbine on the upper end of the tower is quite expensive. Further, access to the upper end of the tower for turbine maintenance and repair is likewise expensive, difficult and dangerous to the installer. Thus, it is advantageous to be able to safely access the wind turbine, and to access the turbine without the use of the extremely large crane.

Other variables relating to the effectiveness of the wind turbine include not only wind velocity, but also changing weather patterns, seasonal variations, as well as the fact that wind rarely blows in the same direction for any substantial length of time. To be cost effective, the turbine must fully utilize the entire range of wind conditions.

The present invention utilizes techniques which were not previously considered. The present invention has achieved a more full utilization of a previously untapped precious natural resource, the wind. In addition, in the preferred embodiment, the present invention utilizes water power for power generation within the system.

SUMMARY OF THE INVENTION

This invention relates generally to a hydro-electric generating system for a structure that, in the preferred embodiment generates electrical energy in two (2) ways, first, by utilizing wind power with a multi-megawatt turbine, and second, by utilizing fluid power. Said system including a wind turbine positioned on the exterior of the structure, said turbine mechanically transported by a cart that is movably mounted to a track situated around the upper exterior and within the structure, said transport means positions the turbine around the upper exterior of the structure in order to effectively utilize wind turbulence, and further transports the turbine within the structure for easy access. In the preferred embodiment, said system further includes an upper level reservoir having a fluid such as water therein, a lower level reservoir having a fluid such as water therein, a first reversible pump, a second pump means, a first and second conduit between the upper level reservoir of fluid and the lower level reservoir of fluid, a valve attached to the first conduit to direct the fluid flow from the upper level reservoir to the lower level reservoir.

BRIEF DESCRIPTION OF THE DRAWINGS

FIG. 2 and FIG. 2A are views of the turbine and track of the system of FIG. 1.

FIG. 3 and FIG. 3A are a side view and enlarged side view of the present invention, having the turbine situated on the top of the structure.

FIG. 1 illustrates a preferred embodiment of a hydroelectric generating system 200 made in accordance with the present invention. Such system 200 generates energy in two (2) ways, by utilizing wind power with a multi-megawatt turbine 7, and by utilizing fluid power. In the preferred embodiment, the above described system 200 is installed within the structure 100. In order to best utilize the speed of the wind, at least one (1) said multi-megawatt wind turbine 7 is strategically positioned on the exterior of the structure 100. As wind speed increases with height, the turbine 7 is positioned at or near the top of the structure 100.

Figure 1:
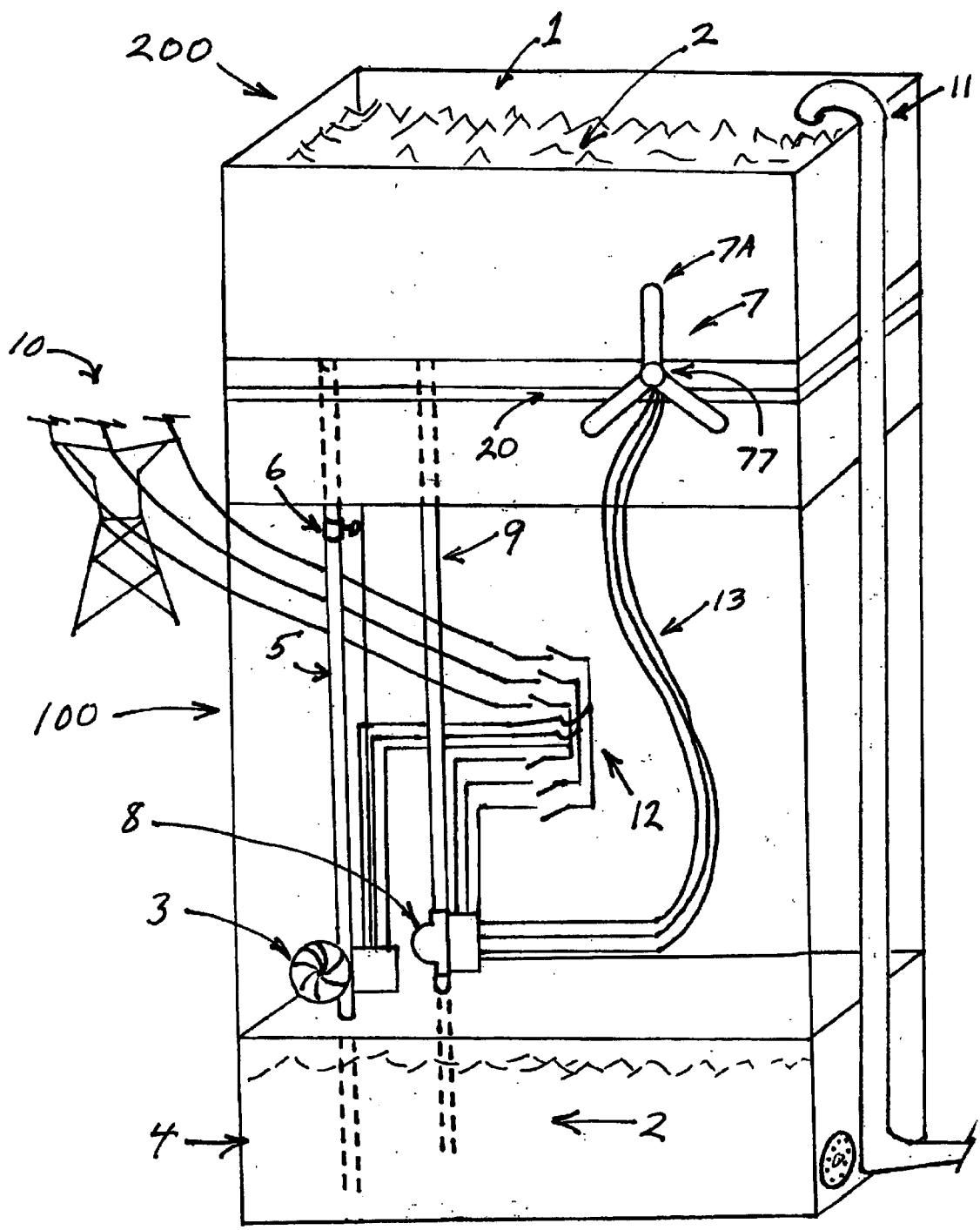
FIG. 1 is a perspective view of the present invention, which along with FIGS. 1A, 1B and 1C that provide enlarged views of elements of the hydro-electric generating system positioned on a track system exterior to and near the top of a tall structure and that provide enlarged views of elements of the wind-driven turbine and means to utilize fluid power of the present invention.
Figure 2:
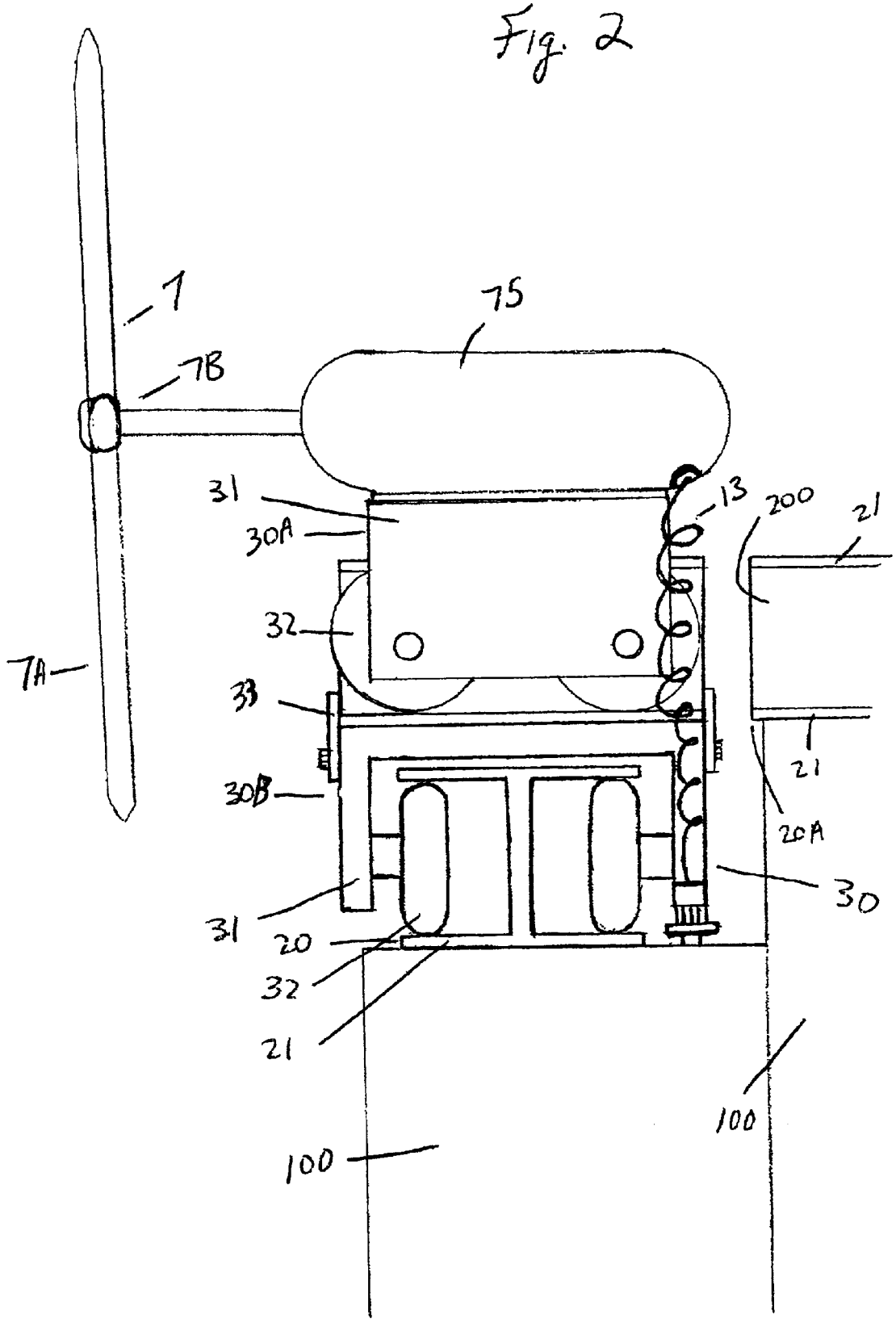

The turbine 7 includes conventional components, including blades 7A, a rotating mount 7B, a gear box (not shown), and a base portion 75, illustrated in FIG. 2, which is secured to the upper portion 30A of the cart 30. The turbine 7 further includes a generator 77 within the gearbox, and is connected to the second pump 8 via conductor lines 13, as shown in FIGS. 1 and 2. The generator 77 of the turbine 7 converts the potential energy caused by the rotation of the blades 7A of the turbine 7 into electrical energy which is applied to the system's 200 electrical means 12.

The system 200 utilizes fluid power by including an upper level reservoir 1, and a lower level reservoir 4. The upper level reservoir 1 receives a fluid 2, such as water, from a fluid intake line 11 used to draw water from an outside water source (not shown), such as a body of water, or municipal utility, and further receives recycled fluid 2 through the system 200 as will be discussed. The lower reservoir 4 receives the fluid 2 from the upper reservoir 1 as the fluid 2 flows through the system 200. The fluid 2 is then returned to the upper reservoir 1 and again recycled through the system 200.

The upper reservoir 1 is in communication with the lower reservoir 4 by a first conduit 5 and a second conduit 9. The reservoirs 1, 4 communicate with one another by conduits 5, 9 for recycling the fluid 2 flowing through the system 200.

Disposed adjacent to the lower reservoir 4 is a reversible hydroelectric megawatt generator/pump 3 connected to the first conduit 5, and a second pump 8 connected to the second conduit 9. Also adjacent to the lower level reservoir 4 is a cap 14 to release fluid from the lower reservoir 4 in order to maintain the level of fluid 2 in the lower reservoir 4.

Referring now to the function of the reversible generator/pump 3 shown in FIG. 1, said generator/pump 3 includes a wheel 33 and a generator (not shown) disposed therein. The fluid 2 flows from the upper level reservoir 1 to the lower level reservoir 4 down-through the conduit 5 wherein it enters the generator/pump 3. The fluid 2 passing through the generator/pump 3 causes the wheel 33 within the generator/pump 3 to rotate. The said generator within the generator/pump 3 converts the potential energy stored in the flowing fluid 2 into electrical energy which is applied to the system's 200 electrical means, generally referred to as numeral 12, which electrical means 12 is known in the art.

The fluid 2 then continues to pass through the generator/pump 3 and down-through the conduit 5 into the lower reservoir 4 within the system 200. The fluid 2 is then pumped through the second conduit 9 by the second pump 8 and returned to the upper reservoir 1. The fluid 2 is then recycled to flow back through the system 200 as described above.

The generator in the generator/pump 3 converts the potential energy stored in the flowing fluid 2 into electrical energy which is supplied to the system's 200 electrical means 12. As will be further discussed, the electrical means 12 supplies electrical power to the system 200, and supplies surplus electrical power not required by the system 200 to an electrical grid 10 outside the structure 100. The generator in the generator/pump 3 is connected to the system's 200 electrical means 12, and such electrical means 12 supplies a first power source for the said generator. In the event the system 200 generates electrical power not immediately used by the system 200, any such surplus electrical energy may be supplied to the electrical grid 10 outside the structure, using connector means known in the art.

It is understood by one skilled in the art that a variety of methods may be used to supply the electrical energy generated to the system's 200 electrical means 12, as well as providing any surplus energy generated by the system 200 to the electrical grid 10 outside the structure 100. Further, the electrical means 12 may be provided by an exterior source to the system 200, such as the electrical system of the structure 100, or may be directly contained within the system 200.

The reversible generator/pump 3 converts the potential energy stored in the flowing fluid 2 into electrical energy used by the system 200 and provided to the electrical grid 10 as discussed above. During times when there is little demand for such electrical energy, the generator/pump 3 serves as a pump to return fluid 2 from the lower level reservoir 4 to the upper level reservoir 1 for recycling purposes. Specifically, the fluid 2 is pumped up-through the first conduit 5 by the generator/pump 3 and returned to the upper reservoir 1.

Adjacent to the upper level reservoir 1 is a valve 6 mounted at the upper portion of the conduit 5. Said valve 6 controls the supply of fluid 2 from the upper level reservoir 1 down-through the conduit 5 into the generator/pump 3 and the lower reservoir 4. Fluid 2 enters the upper reservoir 1 from the fluid intake 11. The fluid intake line 11 is used to draw water from an outside water source (not shown), such as a body of water, or municipal utility. As such, in the event of fluid evaporation within the system 200, said fresh fluid 2 from an outside source enters the upper reservoir 1 from the fluid intake 11. Recycled fluid 2 is also received in the upper level reservoir 1 from the lower level reservoir 4 via the second conduit 9, as well as the first conduit 5 during periods of little demand for electrical energy. Such fluid 2 is directed by the valve 6 to the first conduit 5 and to the generator/pump 3 which turns the generator within the generator/pump 3 to produce electricity.

The generator/pump 3 and the pump 8 are first powered by the electrical means 12 within the system 200, but may receive a second power source external to the system 200 via the electrical grid 10 outside the structure 100.

Figure 3:
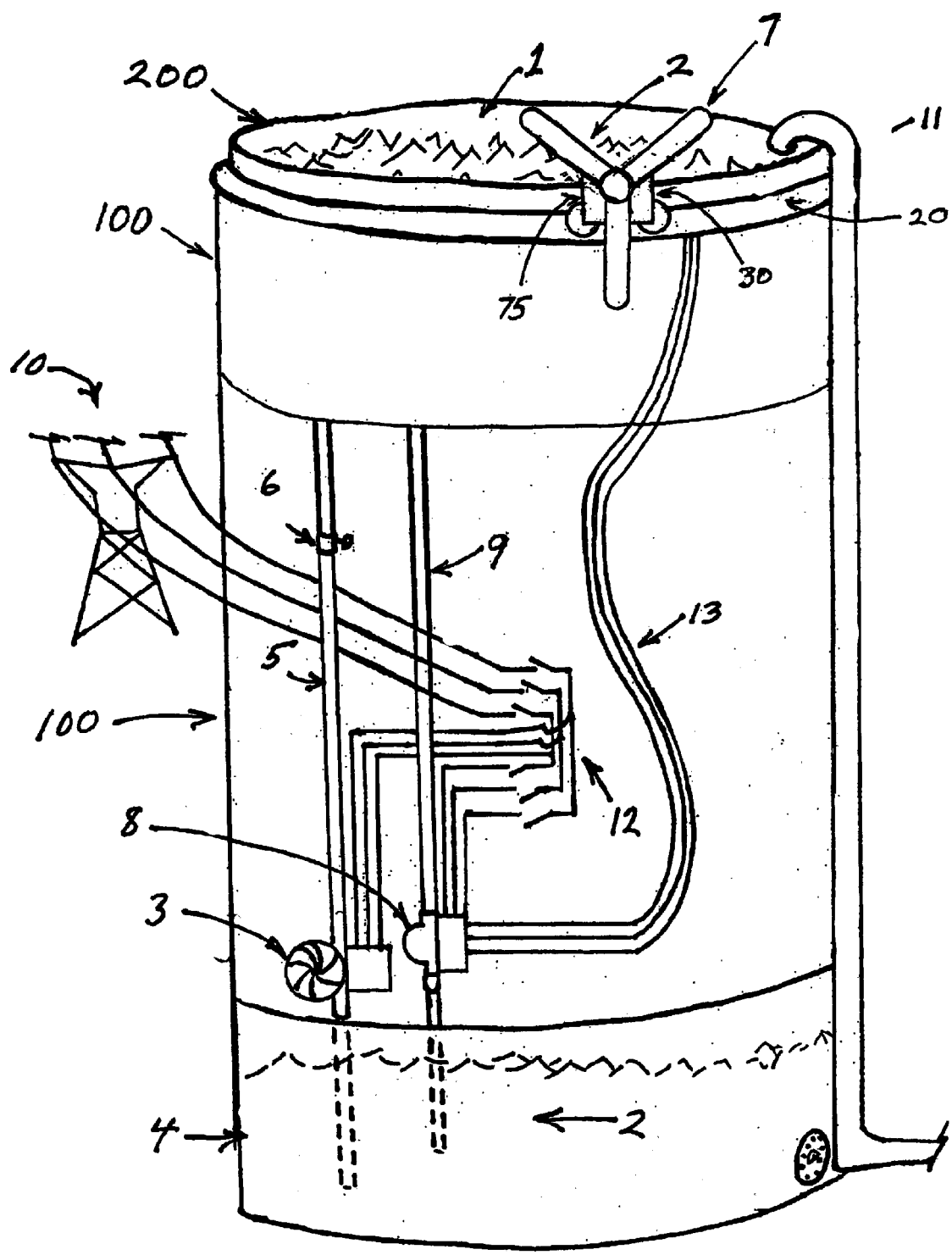

In the preferred embodiment, the multi-megawatt wind turbine 7 is positionably transported mechanically by a cart 30, said cart 30 having an upper portion 30A and a lower portion 30B, wherein said lower portion 30B is adapted to move along a track 20, which track 20 having at least one rail 21 positioned at or around the top exterior of the structure 100. Although said track 20 may operate with one rail 21, it is preferred that said track 20 be comprised of a pair of horizontally spaced apart rails 21. Said track 20 may be mounted around the upper exterior of the structure 100 as shown in FIG. 1, or may be mounted around the top exterior of the structure 100, as shown in FIG. 3.

The upper portion 30A of the cart 30 is releasably secured to the bottom portion 30B at joint 33. The various methods of releasably attaching upper portion 30A to lower portion 30B are known in the art. The upper portion 30A, when released from the lower portion 30B, is adapted to move along a second track 20A having at least one rail 21A, which second track 20A continues within the structure 100 through an access port 200, illustrated in FIG. 2. The upper portion 30A includes the turbine 7 and the turbine's 7 components as will be described. As a result, access to the turbine 7, such as for maintenance purposes, is accomplished from within the structure 100 by simply tracking the upper portion 30A of the cart 30 carrying the turbine 7 in and out of the structure 100 on the track 20A through the access port 200 of the structure 100. A user is not required to access the turbine 7, for example for maintenance purposes, from the exterior of the structure 100 which would be dangerous. The user has access to the turbine 7 from within the structure 100 or atop the structure 100, protected from the elements and the heights. In addition, the turbine 7 is movably positioned around the upper exterior of the structure 100 on the track 20 in order to utilize the varying direction of the wind. It is understood by one skilled in the art that a variety of methods may be used to mount the turbine 7 to the upper portion 30A of the cart 30, and to attach the tracks 20 and 20A to the structure 100 as described.

The upper portion 30A and the lower portion 30B of the cart 30 each include a frame 31 having at least one roller 32 to facilitate the movement of the cart 30. Mechanical means for moving the cart 30 along the tracks 20 and 20A is known in the art.

The generator/pump 3 and the pump 8 are first powered by the electrical means 12 within the system 200, but may receive a second power source external to the system 200 via the electrical grid 10 outside the structure 100.

Further, wind shear on the exterior of the structure 100 will cause the blades 7A of the turbine 7 to turn. The generator 77 of the turbine 7 is electrically connected to the second pump 8 via the conductor lines 13. The generator 77 of the turbine 7 converts the potential energy caused by the rotation of the blades 7A of the turbine 7 into electrical energy which is applied to the system's 200 electrical means 12. The turbine 7 may be used in conjunction with the fluid flow process described herein to produce energy within the system 200, or may be used independent of the fluid flow process.

Excess power generated from the system 200 may be passed to the electrical grid 10 outside the structure 100. Likewise, the generator/pump 3 and the pump 8 of the system 200 may accept electrical energy from the utility network's electrical grid 10 outside the structure 100.

The structure 100 having a sufficient wall thickness and design to provide sufficient rigidity to provide structural support for the above-described components mounted to both the inside and outside of the structure 100.

One preferred embodiment is a hydro-electric generating system for generating electrical energy from wind passing a structure, which has a wind turbine that includes a base portion, blades, and a generator, and the system has fluid power means for raising water which are operatively connected to the wind turbine for power generated by the wind turbine, and the system has electric power means for connecting electrical power generated by the turbine with a power grid, also, a track is positioned at or around an upper portion of the structure, and to facilitate movement of the cart along the track, a cart having a frame on rollers, and the base portion of the turbine is secured to the cart for movement of the cart and turbine to desired locations along the track relative to the wind passing the structure.

In a further embodiment of the foregoing described hydroelectric generating system, the fluid power means would include an upper level reservoir and a lower level reservoir, with the upper level reservoir connected to the lower level reservoir by a first conduit and a second conduit, also, a reversible generator/pump is connected to the first conduit and preferably is located adjacent to the lower reservoir, and this embodiment includes a valve preferably located adjacent to the upper level reservoir, and with this combination, the upper level reservoir receives fluid from an outside water source, and that upper reservoir further can receives fluid through the system, and the lower reservoir receives the fluid from the upper reservoir as the fluid flows through the system, also, the reversible generator/pump includes a wheel and a generator, and this embodiment has electrical means to supply electrical power to the system, wherein the fluid passes through the reversible generator/pump and through the conduit into the lower reservoir, and from the lower reservoir the fluid is then pumped through the second conduit by pump means and returned to the upper reservoir, and in this manner, the fluid is recycled to flow back through the system, and with this combination, the generator of the reversible generator/pump converts the potential energy stored in the flowing fluid into electrical energy, which is supplied to the system's electrical means and/or supplied to the power grid, and this reversible generator/pump provides electrical energy and serves as a pump to return fluid from the lower reservoir to the upper reservoir for recycling through the system.

The elements of the foregoing preferred embodiments are useful to a method of generating electrical energy from wind passing a structure, comprising the steps of: positioning a track having at least one rail at or around the upper portion of the structure; mounting a cart on the track, wherein the cart has at least one roller and preferably multiple rollers to facilitate movement of the cart on the track, and a wind turbine is secured on the cart; and positioning the cart and the wind turbine to desired locations along the track relative to the wind passing the structure, and connecting electrical power generated by the wind turbine with a power grid.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalence, rather than by the examples given.

I claim:

1. A system for generating electrical energy for a power grid, comprising: a reservoir structure having an upper reservoir for fluid; a wind turbine including a base portion, blades, and a first electric generator; a second electric generator driven by fluid power from said upper reservoir; a first conduit for conveying fluid by gravity to drive said second generator; an electric pump and means for piping fluid up to said upper reservoir; a plurality of switches for connecting electric power output of said generator, a first switch to connect said electric output to a power grid, a second switch to connect electric output of said first generator to power said electric pump; a track positioned proximate the upper portion of said structure, said wind turbine moveably mounted upon said track.

2. The generating system as recited in claim 1, further comprising: a lower reservoir; said upper reservoir is in fluid connection with said lower reservoir via said first conduit and a second conduit; a valve located between said first conduit and said upper reservoir; said second generator being reversible having a generating mode and a pump mode and a wheel wherein the reversible generator/pump converts energy in the flowing fluid into electrical energy and pumps return fluid from the lower reservoir to the upper reservoir.

3. The generating system of claim 1, further comprising a fluid valve located between said upper level reservoir and said first conduit, a lower reservoir for fluid that has flown through said second generator and said first conduit, and a second conduit in fluid connection with said pump for conveying fluid from said lower reservoir to said upper reservoir.

4. The generating system of claim 3, wherein structural members support said upper reservoir above said lower reservoir, and support said track, and said moveable mount for said wind turbine includes a mounting upon a cart having a frame, said frame having at least one roller adapted to facilitate movement of the cart along the track to locations along the track predetermined to be exposed to wind currents useful for electric generation by said wind turbine.

5. The generating system of claim 1, further comprising a controller, electrically coupled between the switches for connecting electric power output of said generators, for determining the electrical demand of the power grid and for controlling said output to satisfy the demand of said grid or of said system.

6. The method of generating electrical energy from a system of a wind driven generator on a moveable cart and a fluid driven generator connected to a conduit, comprising the steps of: positioning a wind turbine on a cart having at least one roller to facilitate movement of said cart on a track having at least one rail moving the cart and the wind turbine to desired locations along the track relative to the wind currents predetermined to be best for power generation; connecting electrical power generated by the wind turbine to an electric pump; releasing fluid from a reservoir structure through a conduit connected to said fluid driven generator; pumping fluid with said electric pump to replenish said reservoir; switching electrical power generated by said system to a power grid.

7. The method of claim 6, wherein said step of switching further comprises the steps of: determining the electric output of said system; sensing the generation of surplus electricity; connecting said surplus electricity to said power grid.

8. A hydro-electric generating system for generating electrical energy for a power grid and storing kinetic energy, comprising:

a tall reservoir structure, located in the path of strong wind currents a hydro-electric generator/pump, reversible in operation, having a generating mode and a pump storage mode and so operative as a generator and that converts to a mega pump, when electricity is applied to it, operative for pumping fluid such as water to the upper reservoir a upper level reservoir for a fluid such as water, and when said fluid is released from said upper reservoir it turns said hydro-electric generator, a second pump and means for piping said fluid, to replenish the upper reservoir a lower reservoir, which receives said fluid until it is recycled through the said system, a conduit connecting said upper reservoir to said hydro-electric generator/pump and then to said lower reservoir a valve, in said conduit to regulate the flow of said fluid from said upper reservoir to said hydro-electric generator/pump a wind turbine generator, that powers said second pump means with electricity and, generates surplus electricity to transmit to the regional power grid or to the hydro-electric generator/pump when it is in the pump mode, conductor means for transmitting electricity within the system and to the power grid electrical switch means to switch electricity to said second pump means or to stop the flow of electricity.

9. The system according to claim 8 said wind turbine generator further comprising;

a track positioned at or around the upper exterior of said reservoir structure a cart including a frame, said frame having at least one roller adapted to facilitate movement along said track; and the base portion of said wind turbine generator is secured to said cart for movement along the track to utilize the best available wind currents.

* * * * *